(12) United States Patent
Chang et al.

(10) Patent No.: US 11,736,987 B2
(45) Date of Patent: Aug. 22, 2023

(54) USER MOBILITY METHOD AND DEVICE

(71) Applicants: SHARP KABUSHIKI KAISHA, Sakai (JP); FG Innovation Company Limited, Tuen Mun (HK)

(72) Inventors: Ningjuan Chang, Shanghai (CN); Shohei Yamada, Osaka (JP)

(73) Assignees: SHARP KABUSHIKI KAISHA, Sakai (JP); FG INNOVATION COMPANY LIMITED, New Territories (HK)

( * ) Notice: Subject to any disclaimer, the term of this patent is extended or adjusted under 35 U.S.C. 154(b) by 0 days.

(21) Appl. No.: 16/471,196

(22) PCT Filed: Dec. 19, 2017

(86) PCT No.: PCT/CN2017/117142
§ 371 (c)(1),
(2) Date: Jun. 19, 2019

(87) PCT Pub. No.: WO2018/113655
PCT Pub. Date: Jun. 28, 2018

(65) Prior Publication Data
US 2019/0387438 A1 Dec. 19, 2019

(30) Foreign Application Priority Data
Dec. 23, 2016 (CN) .......................... 201611213899.0

(51) Int. Cl.
*H04W 36/00* (2009.01)
*H04W 76/27* (2018.01)
*H04W 72/21* (2023.01)

(52) U.S. Cl.
CPC ....... *H04W 36/0055* (2013.01); *H04W 72/21* (2023.01); *H04W 76/27* (2018.02)

(58) Field of Classification Search
CPC ............. H04W 36/0055; H04W 76/27; H04W 72/0413; H04W 36/0058; H04W 36/08;
(Continued)

(56) References Cited

U.S. PATENT DOCUMENTS 8,724,568 B2 * 5/2014 Jung ................... H04W 36/385
370/329
10,075,881 B2 * 9/2018 Yi ...................... H04W 36/0061
(Continued)

FOREIGN PATENT DOCUMENTS

CN 1968493 A 5/2007
CN 101242643 A 8/2008
(Continued)

OTHER PUBLICATIONS

NTT DOCOMO, "New SID Proposal: Study on New Radio Access Technology", RP-160671, 3GPP TSG RAN Meeting #71, Göteborg, Sweden, Mar. 7-10, 2016.
(Continued)

*Primary Examiner* — Hanh N Nguyen
(74) *Attorney, Agent, or Firm* — Finnegan, Henderson, Farabow, Garrett & Dunner, L.L.P.

(57) ABSTRACT

The present application provides a method performed by user equipment (UE), comprising: receiving, from a base station, a first radio resource control (RRC) message including a handover command; determining whether a first condition included in the first RRC message is met; and if the first condition is met, sending a handover indication to the base station, the handover indication being used to inform the base station that the UE is about to start performing a handover. The present application further provides UE and a corresponding base station. By means of the technical solution of the present application, the data transmission interruption time in the handover procedure in the NR can be
(Continued)

further reduced, and an unnecessary incorrect handover is avoided.

4 Claims, 5 Drawing Sheets

(58) Field of Classification Search
CPC ..... H04W 76/04; H04W 80/02; H04W 36/36; H04W 36/18; H04W 36/026; H04W 74/0833; H04W 36/011
See application file for complete search history.

(56) References Cited

U.S. PATENT DOCUMENTS

| | | | |
|---|---|---|---|
| 10,244,444 B2* | 3/2019 | Ozturk | H04W 36/08 |
| 10,512,009 B2* | 12/2019 | Wang | H04W 76/15 |
| 2009/0016301 A1* | 1/2009 | Sammour | H04L 69/04 370/331 |
| 2009/0034476 A1* | 2/2009 | Wang | H04W 28/06 370/310 |
| 2009/0149189 A1* | 6/2009 | Sammour | H04W 80/02 455/450 |
| 2009/0296660 A1 | 12/2009 | Weng | |
| 2010/0232376 A1* | 9/2010 | Wu | H04W 76/20 370/329 |
| 2011/0310845 A1 | 12/2011 | Jung et al. | |
| 2015/0173120 A1 | 6/2015 | Yamada | |
| 2015/0215987 A1* | 7/2015 | Kim | H04L 1/08 370/329 |
| 2016/0066241 A1 | 3/2016 | Wu et al. | |
| 2016/0374139 A1 | 12/2016 | Chen et al. | |
| 2018/0098376 A1* | 4/2018 | Jang | H04W 28/02 |
| 2023/0040867 A1* | 2/2023 | Hori | H04W 76/19 |

FOREIGN PATENT DOCUMENTS

| | | |
|---|---|---|
| CN | 101729396 A | 6/2010 |
| CN | 102158303 A | 8/2011 |
| CN | 104254144 A | 12/2014 |
| CN | 104581849 A | 4/2015 |
| CN | 105103610 A | 11/2015 |
| CN | 105230077 A | 1/2016 |
| CN | 105323786 A | 2/2016 |
| CN | 105704769 A | 6/2016 |
| CN | 105814942 A | 7/2016 |
| GB | 2528913 A | 2/2016 |
| KR | 10-2014-0049455 A | 4/2014 |
| WO | 2011/018033 A1 | 2/2011 |
| WO | 2016021890 | 2/2016 |
| WO | 2016/061785 A1 | 4/2016 |
| WO | 2016/195735 A1 | 12/2016 |

OTHER PUBLICATIONS

Ericsson, "Inter-cell Handover in NR", R2-168730, 3GPP TSG-RAN WG2 Meeting #96, Reno, Nevada, USA, Nov. 14-18, 2016.
3GPP TS 36.321 V14.1.0 (Dec. 2016), 3rd Generation Partnership Project, Technical Specification Group Radio Access Network, Evolved Universal Terrestrial Radio Access (E-UTRA), Medium Access Control (MAC) protocol specification (Release 14).
Indian Patent Office, Office Action in Application No. 202248020006, dated Jan. 11, 2023 (6 pgs.).
Korean Intellectual Property Office, Notice of Allowance for Application No. 10-2019-7019901, dated Jan. 13, 2023 (7 pgs.).

* cited by examiner

USER MOBILITY METHOD AND DEVICE

TECHNICAL FIELD

The present application relates to the field of wireless communications technology. More particularly, the present application relates to a method for communication between devices, user equipment, and a base station.

BACKGROUND

A new research project on 5G technical standards (see non-patent literature: RP-160671: New SID Proposal: Study on New Radio Access Technology) was proposed by NTT DOCOMO in the 3rd Generation Partnership Project (3GPP) RAN #71 plenary session held in March 2016, and was approved. The goal of the research project is to develop a New Radio (NR) access technology to meet all of the application scenarios, requirements, and deployment environments of 5G. NR mainly has three application scenarios: Enhanced Mobile Broadband Communication (eMBB), massive Machine Type Communication (mMTC), and Ultra Reliable and Low Latency Communication (URLLC). According to the planning of the research project, the standardization of NR is conducted in two stages: the first-stage standardization will be completed by the middle of 2018; the second-stage standardization will be completed by the end of 2019. The first-stage standard specifications need to be forward-compatible with the second-stage standard specifications, while the second-stage standard specifications need to be established on the basis of the first-stage standard specifications and to meet all requirements of 5G NR technical standards.

In the current LTE new system, the user mobility in a connected state is mainly implemented through a handover procedure. The procedure is briefly described as follows:

Phase 1: A base station delivers a measurement configuration to user equipment (User Equipment, UE); the UE performs measurement based on the measurement configuration; and when the configured reporting condition is met, the UE sends a measurement report to the base station. The base station considers, on the basis of the received measurement report and other factors such as the base station load, whether it is necessary to hand over the UE.

Phase 2: If a handover is to be performed, a source base station triggers a handover preparation procedure to send a handover request message to a target base station; the target base station considers, according to factors such as a context of the UE in the handover request message and resources of the target base station, whether to accept the UE, and feeds back a handover acknowledgment message to the source base station if the UE can be accepted, wherein the handover acknowledgment message includes a handover command.

Phase 3: The source base station delivers the handover command to the UE, and starts to forward data to the target base station. The UE that receives the handover command immediately executes the handover command and accesses the target base station.

Phase 3: After confirming the successful access by the UE, the target base station sends a handover complete message to the source base station.

It can be seen from the above that the handover procedure in the LTE system may cause an interruption of data transmission. In the subsequent version of the LTE system, the optimization of the handover procedure, such as a handover without a random access procedure, is intended to reduce a handover latency and overheads.

In the 5G NR technology requirement, it is necessary to satisfy the data interrupt latency of "0 ms" as much as possible in a mobile handover procedure to meet the mobility requirement of seamless handover in the NR. In a current handover procedure, one cause of a handover failure resulting in a long data transmission interruption is that the handover command is not delivered in time. One feasible approach to address this problem is a conditional handover. In the conditional handover, a relatively conservative measurement report threshold is set, so that a base station acquires a measurement result in advance, and performs a handover preparation procedure according to the measurement result and a selected target base station. In this way, the base station can deliver a handover command to UE in advance before an actual handover condition is met, wherein the handover command carries the condition for handover execution. Different from the existing handover mechanism of the Long Term Evolution (LTE) system, after receiving a handover command, UE does not perform a handover immediately, but performs monitoring according to a handover condition carried in a handover command message. When the handover condition is met, the UE starts to execute the handover command and accesses a target cell.

SUMMARY OF INVENTION

In a next generation communication system, how to improve mobile performance of a user to achieve the "0 ms" interruption time has become an urgent problem to be solved.

According to an aspect of the present application, a method performed by user equipment (UE) is provided, comprising: receiving, from a base station, a first radio resource control (RRC) message comprising a handover command; determining whether a first condition comprised in the first RRC message is met; and if the first condition is met, sending a handover indication to the base station, the handover indication being used to inform the base station that the UE is about to start performing a handover.

In an embodiment, the method further comprises receiving, from the base station, a response to the handover indication prior to performing the handover.

In an embodiment, the response comprises a Medium Access Control (MAC) control element.

In an embodiment, transmission of the handover indication is configured by the base station by means of an RRC message.

In an embodiment, sending a handover indication to the base station comprises sending the handover indication to the base station by a MAC layer.

In an embodiment, the method further comprises starting to perform the handover after the handover indication is sent to the base station by the MAC layer.

In an embodiment, sending the handover indication to the base station by a MAC layer comprises: determining whether there is an uplink resource for new transmission in a current transmission time interval (TTI); and if there is an uplink resource for new transmission, the handover indication indicates that the handover is triggered and is not canceled, and the uplink resource is capable of accommodating the handover indication and a corresponding MAC sub-header, generating and sending the handover indication, the handover indication comprising a MAC control element.

In an embodiment, sending the handover indication to the base station by means of a MAC layer comprises: determining whether there is an uplink resource for new transmission in a current TTI; and if there is an uplink resource for new transmission, and the handover indication indicates that the handover is triggered and is not canceled, generating and sending the handover indication, the handover indication being a MAC control element; or if there is no uplink resource for new transmission, triggering a scheduling request.

In an embodiment, in one or more of the following cases, if transmission of the handover indication is triggered, the triggered transmission of the handover indication is canceled:

an indication to cancel the transmission of the handover indication is received from an upper layer of the MAC layer;

MAC is reset; and the handover indication is included in a MAC PDU to be sent.

In an embodiment, the handover indication comprises a dedicated logical channel identity (LCID).

According to another aspect of the present application, user equipment (UE) is provided, comprising: a receiving unit, configured to receive, from a base station, a first radio resource control (RRC) message comprising a handover command; a determining unit, configured to determine whether a first condition comprised in the first RRC message is met; and a sending unit, configured to send, if the first condition is met, a handover indication to the base station, the handover indication being used to inform the base station that the UE is about to start performing a handover.

In an embodiment, the receiving unit is further configured to receive, from the base station, a response to the handover indication prior to performing the handover.

In an embodiment, the response comprises a Medium Access Control (MAC) control element.

In an embodiment, transmission of the handover indication is configured by the base station by means of an RRC message.

In an embodiment, the sending unit is configured to: send the handover indication to the base station by a MAC layer.

In an embodiment, the handover is started after the handover indication is sent to the base station by the MAC layer.

In an embodiment, the sending unit is configured to: determine whether there is an uplink resource for new transmission in a current transmission time interval (TTI); and if there is an uplink resource for new transmission, the handover indication indicates that a handover is triggered and is not canceled, and the uplink resource is capable of accommodating the handover indication and a corresponding MAC sub-header, generate and send the handover indication, the handover indication comprising a MAC control element.

In an embodiment, the sending unit is configured to: determine whether there is an uplink resource for new transmission in a current transmission time interval TTI; and if there is an uplink resource for new transmission, and the handover indication indicates that the handover is triggered and is not canceled, generate and send the handover indication, the handover indication being a MAC control element; or if there is no uplink resource for new transmission, trigger a scheduling request.

In an embodiment, in one or more of the following cases, if transmission of the handover indication is triggered, the triggered transmission of the handover indication is canceled:

an indication to cancel the transmission of the handover indication is received from an upper layer of the MAC layer;

MAC is reset; and the handover indication is included in a MAC PDU to be sent.

In an embodiment, the handover indication comprises a dedicated logical channel identity (LCID).

According to another aspect of the present application, a method performed by a base station is provided, comprising: sending a first radio resource control (RRC) message comprising a handover command to user equipment (UE); and receiving a handover indication from the UE.

In an embodiment, the method further comprises sending a response message to the UE after receiving the handover indication from the UE.

In an embodiment, the method further comprises stopping data transmission and communication with the UE.

In an embodiment, the method further comprises performing data forwarding to a target cell.

In an embodiment, transmission of the handover indication is configured by means of an RRC message.

According to another aspect of the present application, a base station is provided, comprising: a sending unit, configured to send a first radio resource control (RRC) message comprising a handover command to user equipment (UE); and a receiving unit, configured to receive a handover indication from the UE.

In an embodiment, the sending unit is further configured to send a response message to the UE after the receiving unit receives the handover indication from the UE.

In an embodiment, the base station further comprises a handover management unit configured to stop data transmission and communication with the UE.

In an embodiment, the base station further comprises a handover management unit configured to perform data forwarding to a target cell.

In an embodiment, transmission of the handover indication is configured by means of an RRC message.

By means of the technical solution of the present application, the data transmission interruption time in the handover procedure in the NR can be further reduced, and UE can reasonably manage handover configuration information to avoid an unnecessary incorrect handover, as well as the resulting signaling overheads and a service interruption.

The present application is not limited to the NR system, and is also applicable to other LTE systems such as LTE systems of Release 15 and later. Furthermore, the present application is also not limited to the conditional handover method, and is also applicable to other handover methods.

BRIEF DESCRIPTION OF DRAWINGS

The above and other features of the present application will become more apparent through the following detailed description made in conjunction with the accompanying drawings, where.

Figure 1:
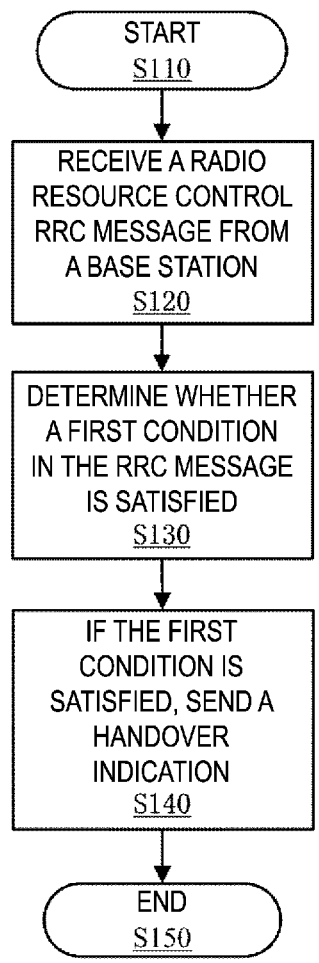
FIG. 1 is a flowchart of a method performed by UE according to an embodiment of the present application.

Many aspects of the present application can be better understood with reference to the following drawings. The components in the figures are not drawn to scale, and are only intended to illustrate the principles of the present application. For ease of illustration and description of some parts of the present application, corresponding parts in the accompanying drawings can be scaled up or scaled down.

The elements and features described in one accompanying drawing or embodiment of the present application can be combined with the elements and features illustrated in one or more other accompanying drawings or embodiments. In addition, in the accompanying drawings, similar reference numerals denote corresponding components in the accompanying drawings, and may be used to indicate corresponding components used in more than one embodiment.

DETAILED DESCRIPTION OF EMBODIMENTS

With reference to the description and accompanying drawings hereinafter, the specific embodiments of the present application are described in detail; and the manners in which the principle of the present application is employed are illustrated. It should be understood that the embodiments of the present application are not limited in scope. Within the spirit and scope defined by the appended claims, the embodiments of the present application may include various variations, modifications, and equivalents.

The features described and/or illustrated with respect to a specific embodiment may be used in one or more other embodiments in the same or similar manner, or may be combined with the features in other embodiments, or may be used to replace the features in other embodiments.

It should be particularly noted that the term "comprise/include" used herein in this text refer to the existence of the features, whole pieces, steps or components, but do not exclude the existence or addition of one or more of other features, whole pieces, steps, or components.

With reference to the accompanying drawings and specific embodiments, a handover method according to the present application is described in detail below.

The present application uses an Evolved Universal Terrestrial Radio Access Network (E-UTRAN), NR and a corresponding core network, and a next-generation core network as an example. It should be noted that the present application is not limited to the E-UTRAN, the NR and corresponding core network and the next-generation core network, and can also be used for other evolved wireless communication systems, such as a 6G wireless communication system, and is applicable to other deployment scenarios such as dual-connectivity/multi-connectivity scenarios. It should be noted that the definition and naming of the base station, the cell, the source base station, the source cell, the target base station, and the target cell may be different in different deployment scenarios or in different wireless communication systems. The present application can also be applied to these scenarios or systems using different naming schemes, for example, an evolved node B (eNB) can be replaced with an NR node (gNB). Similarly, in the NR and/or subsequent versions of the E-UTRAN communication system, based on LTE, the radio protocol layer also includes all or some functions provided by a Radio Resource Control (RRC) layer, a Packet Data Convergence Protocol (PDCP) layer, a Radio Link Control (RLC) layer, and a Medium Access Control (MAC) layer, and may also include other functions that are not provided by the PDCP layer, the RLC layer, and the MAC layer, such as the beam management function. The protocol layers described in the present application, including the RRC, PDCP, RLC and MAC layers, are applicable to all equivalent radio protocol layer concepts in the E-UTRAN, NR and other systems.

In the present application, a source cell can also be referred to as a source base station, or can be a source beam (beam) and a source transmission point (TRP), and a target cell can also be referred to as a target base station, or can be a target beam and a target transmission point. A source cell refers to a base station that serves UE before a handover procedure is performed or a cell that serves UE or on which UE camps before cell reselection. A target cell refers to a base station that serves the UE after the handover procedure is performed, i.e., a cell indicated in a handover command, or a cell that serves the UE or on which the UE camps after the cell reselection.

In the present application, after receiving an RRC message including a handover command, UE maintains communication, including data transmission, with a source base station before performing a handover, so as to further reduce the data transmission interruption time.

FIG. 1 is a flowchart of a method performed by UE according to an embodiment of the present application. As shown in FIG. 1, the method includes the following steps:

Step S110: start performing the method.

Step S120: receive, from a base station, a first radio resource control RRC message including a handover command.

Step S130: determine whether a first condition included in the first RRC message is met.

Step S140: if the first condition is met, send a handover indication to the base station, the handover indication being used to inform the base station that the UE is about to start performing a handover. Preferably, a response to the handover indication can be received from the base station prior to performing the handover. For example, the response may include a MAC control element.

For example, transmission of the handover indication can be configured by the base station by means of an RRC message. Preferably, the handover indication may include a dedicated logical channel identity LCID.

For example, the handover indication is sent to the base station by means of the Medium Access Control MAC layer. Preferably, the handover is started after the handover indication is sent to the base station by means of the MAC layer.

In an embodiment, sending a handover indication to the base station by means of the Medium Access Control MAC layer comprises: determining whether there is an uplink resource for new transmission in a current transmission time interval TTI; and if there is an uplink resource for new transmission, the handover indication indicates that a handover is triggered and is not canceled, and the uplink resource is capable of accommodating the handover indication and a corresponding MAC sub-header, generating and sending the handover indication, the handover indication comprising a MAC control element.

In an embodiment, sending a handover indication to the base station by means of the Medium Access Control MAC layer comprises: determining whether there is an uplink resource for new transmission in a current transmission time interval TTI; and if there is an uplink resource for new transmission, and the handover indication indicates that a handover is triggered and is not canceled, generating and sending the handover indication, the handover indication being a MAC control element; or if there is no uplink resource for new transmission, triggering a scheduling request.

In an embodiment, in one or more of the following cases, if the transmission of the handover indication is triggered, the triggered transmission of the handover indication is canceled:

an indication to cancel the transmission of the handover indication is received from an upper layer of the MAC layer;

MAC is reset; and the handover indication is included in a MAC PDU to be sent.

Step S150: the method ends here.

Figure 2:
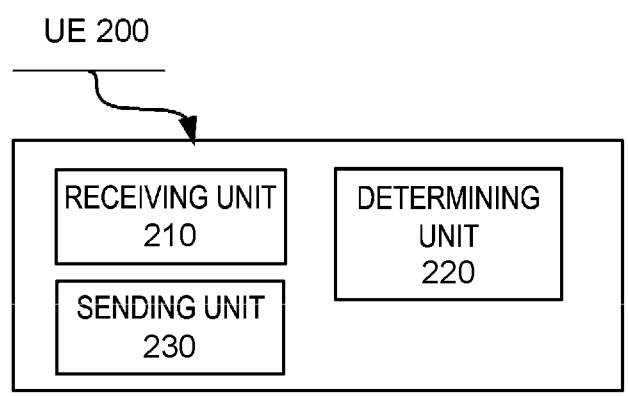
FIG. 2 is a block diagram of user equipment according to an embodiment of the present application.

FIG. 2 is a block diagram of user equipment (UE) according to an embodiment of the present application. As shown in FIG. 2, UE 200 includes a receiving unit 210, a determining unit 220, and a sending unit 230. Those skilled in the art should understand that the UE 200 can also include other functional units required to implement its functions, such as various processors, memories, radio frequency signal processing units, baseband signal processing units, and other units. However, for simplicity, a detailed description of these well-known elements is omitted.

The receiving unit 210 is configured to receive, from a base station, a first radio resource control RRC message including a handover command.

The determining unit 220 is configured to determine whether a first condition included in the first RRC message is met.

The sending unit 230 is configured to send, if the first condition is met, a handover indication to the base station, the handover indication being used to inform the base station that the UE is about to start performing a handover.

Alternatively, the receiving unit 210 can be configured to receive, from the base station, a response to the handover indication prior to performing the handover. For example, the response can include a MAC control element.

In an embodiment, transmission of the handover indication is configured by the base station by means of an RRC message. Preferably, the handover indication may include a dedicated logical channel identity LCID.

Alternatively, the sending unit 230 can be configured to send the handover indication to the base station by means of the Medium Access Control MAC layer. Preferably, the UE starts to perform the handover after the handover indication is sent.

In an embodiment, the sending unit 230 is configured to: determine whether there is an uplink resource for new transmission in a current transmission time interval TTI; and if there is an uplink resource for new transmission, the handover indication indicates that a handover is triggered and is not canceled, and the uplink resource is capable of accommodating the handover indication and a corresponding MAC sub-header, generate and send the handover indication, the handover indication comprising a MAC control element.

In an embodiment, the sending unit 230 is configured to: determine whether there is an uplink resource for new transmission in a current transmission time interval TTI; and if there is an uplink resource for new transmission, and the handover indication indicates that a handover is triggered and is not canceled, generate and send the handover indication, the handover indication being a MAC control element; or if there is no uplink resource for new transmission, trigger a scheduling request.

In an embodiment, in one or more of the following cases, if the transmission of the handover indication is triggered, the triggered transmission of the handover indication is canceled:

an indication to cancel the transmission of the handover indication is received from an upper layer of the MAC layer;

MAC is reset; and the handover indication is included in a MAC PDU to be sent.

Figure 5:
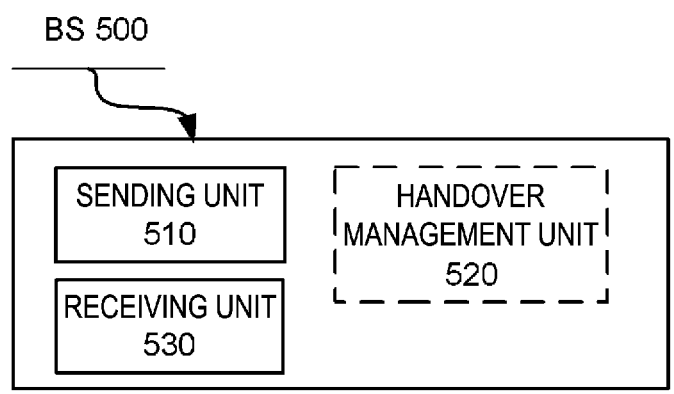
FIG. 5 is a block diagram of a base station according to an embodiment of the present application.

FIG. 5 is a block diagram of a base station according to an embodiment of the present application. As shown in FIG. 5, the base station 500 includes a sending unit 510 and a receiving unit 530, and optionally, includes a handover management unit 520. Those skilled in the art should understand that the base station 500 can also include other functional units required to implement its functions, such as various processors, memories, radio frequency signal processing units, baseband signal processing units, and other units. However, for simplicity, a detailed description of these well-known elements is omitted.

The sending unit 510 is configured to send a first radio resource control RRC message including a handover command to user equipment (UE).

The receiving unit 530 is configured to receive a handover indication from the UE.

In an embodiment, the sending unit 510 is further configured to send a response message to the UE after the receiving unit 530 receives a handover indication from the UE.

In an embodiment, the handover management unit 520 is configured to stop data transmission and communication with the UE.

In an embodiment, the handover management unit 520 is configured to perform data forwarding to a target cell.

Preferably, transmission of the handover indication is configured by the RRC message.

Embodiment 1: Timer-Based Handover Configuration Information Management Method

In this embodiment, the UE manages received handover configuration information on the basis of a timer. In short, if the timer is running, the UE considers that a received or stored handover configuration is valid; if the timer is not running, for example, if the timer expires or stops, the UE considers that a received or stored handover configuration is invalid, or the UE releases/clears/discards the received or stored handover configuration information.

This timer can be referred to as a validity timer. Specifically, the implementation method in this embodiment is described.

In an embodiment, when receiving from a source base station a first RRC message that includes a handover command, the UE or the UE RRC layer can perform the following operations:

1. starting or restarting a validity timer; and
2. storing the received handover configuration.

The timer is used for handover configuration management. Optionally, the handover configuration includes all or a part of the configuration in the RRC message including the handover command; or optionally, the handover configuration includes the configuration in the handover command. In other embodiments, the handover configuration can also be expressed as a handover command.

Optionally, the handover command includes a combination of one or more of mobility control information of a target cell (such as a cell identifier, a cell frequency, and random access information), system information, as well as a radio resource configuration, a measurement configuration, security information, and a secondary cell configuration of UE in a target cell.

Optionally, the above operations are in no particular order.

Optionally, the UE or the UE RRC performs the operation 1 only when the first RRC message including the handover command is received and this message includes the timer configuration.

Optionally, the handover is a conditional handover, that is, the handover command includes information about a first condition, and when the first condition is met, the UE starts to perform a handover procedure.

For example, the first condition can be a measurement event, for instance, the first condition can be that the signal quality of a neighboring cell is better than that of a serving cell by a threshold for a period of time, and the neighboring cell corresponds to the target cell for handover.

In another embodiment, when the UE starts to perform a handover procedure, or when the UE receives a second RRC message and the UE has the stored handover configuration received from the first RRC message, the UE or the UE RRC stops the validity timer; or the UE or UE RRC considers that the validity timer expired.

When the validity timer stops or expires, the UE releases the stored handover configuration received from the first RRC message. Here, "release" can also be expressed as "discard," "clear," and the like. Optionally, the UE RRC layer (indicating to the lower layer) cancels the transmission of the handover indication (see embodiments 15 to 17 below).

The second RRC message is used to release an RRC connection, or is used to indicate that the UE enters an inactive state, or is used to indicate that the UE suspends the RRC connection (RRC suspend). Further, the second RRC message can be an RRC connection reconfiguration message or an RRC connection release message. It should be noted that the inactive state herein refers to a state between an RRC connected state and an RRC idle state, and the name of this state has not been determined in the NR. Sometimes this state can be referred to as a new state. This new state can be an independent RRC state, or can be a sub-state of the RRC connected or RRC idle state. This state in LTE or E-UTRAN can also be referred to as a light connected state (light connected). Other forms of commands and definitions of this state are within the scope of this application for the purposes of the present application.

In an implementation, the validity timer is configured by the base station by means of an RRC message, such as the first RRC message including the handover command, wherein the configuration of the validity timer includes a value of the timer. Optionally, the validity timer can be configured by a source cell or by a target cell. Optionally, in a scenario in which a plurality of handover commands or a plurality of handover target cells are supported, the validity timer and/or its configuration can be configured to be distinguishable for each handover command or for each target cell, or the validity timer is configured to be distinguishable for a handover command or for a target cell, and its value is a common value shared among all handover commands or target cells.

Optionally, if the validity timer is configured to be distinguishable for a target cell or for a handover command, the foregoing solution in this embodiment can also be performed individually for each target cell or each handover command.

The above method in this embodiment is also applicable to non-handover scenarios such as UE-based mobility, and is further applicable to, for example, cell reselection. The following embodiments are described in combination with the UE-based mobility.

In an embodiment, the UE receives a cell reselection configuration sent by the base station, wherein the cell reselection parameter is received through dedicated signaling, such as an RRC connection release message, an RRC connection reconfiguration message, and the like. The UE performs cell reselection according to the received cell reselection configuration. The cell reselection occurs in an RRC idle state or an RRC inactive state. The UE manages the received cell reselection configuration on the basis of the validity timer. The validity timer can be configured by broadcast signaling or by dedicated signaling. Further, the validity timer can be included in the cell reselection configuration to be configured for the UE together with the cell reselection configuration through dedicated signaling. The cell reselection configuration includes configuration information for cell reselection such as preferred cell information, reselection frequency priority, reselection cell priority, and the like. The UE managing the received cell reselection configuration on the basis of the validity timer includes: if the timer is running, the UE considers that the stored cell reselection configuration is valid; and if the timer is not running, for example, if the timer expires or stops, the UE considers that the stored cell reselection configuration is invalid, and/or the UE deletes the stored cell reselection configuration. The cell reselection configuration is used for UE-based mobility, and is further used for cell reselection, and the name of the cell reselection configuration can also be other names such as idle state mobility control information or inactive state mobility control information.

In an embodiment, when receiving from a base station a message including the cell reselection configuration, the UE or the UE RRC layer performs the following operations:

1. starting or restarting a validity timer; and
2. storing the received cell reselection configuration.

The timer is used for cell reselection configuration management.

Optionally, the above operations are in no particular order.

Optionally, the UE or the UE RRC performs the operation 1 only when the cell reselection configuration is received and this message includes the timer configuration.

In an embodiment, when the UE enters an RRC connected state, or when the UE enters an RRC idle state, or a tracking area update occurs, the UE or the UE RRC stops the validity timer, or the UE or the UE RRC considers that the validity timer expired.

When the validity timer stops or expires, the UE releases the stored cell reselection configuration. Here, "release" can also be expressed as "discard," "clear," and the like.

In another embodiment, the UE releases the stored cell reselection configuration without depending on the validity timer, that is, when the UE enters an RRC connected state, or when the UE enters an RRC idle state, or when a tracking area update occurs.

Embodiment 2: Condition-Based Handover Configuration Information Management Method In this embodiment, the UE manages the received handover configuration according to some conditions. When the condition is not met, the UE or the UE RRC considers that the received or stored handover configuration is valid. When the condition is met, the UE or the UE RRC considers that the received handover configuration is invalid, or the UE or the UE RRC releases the received or stored handover configuration. Here, "release" can also be expressed as "clear," "discard," and the like.

Specifically, the implementation method in this embodiment is described.

Step 1: when receiving from a source base station a first RRC message including a handover command, the behavior performed by the UE or the UE RRC layer includes storing the received handover configuration.

Optionally, the handover configuration includes all or a part of the configuration in the RRC message including the handover command; or optionally, the handover configuration includes the configuration in the handover command.

Optionally, the handover is a conditional handover, that is, the handover command includes information about a first condition, and when the first condition is met, the UE starts to perform a handover procedure.

For example, the first condition can be a measurement event, for instance, the first condition can be that the signal quality of a neighboring cell is better than that of a serving cell by a threshold for a period of time. The neighboring cell corresponds to the target cell for handover.

Optionally, the handover command includes a combination of one or more of mobility control information of a target cell (such as a cell identifier, a cell frequency, and random access information), system information, as well as a radio resource configuration, a measurement configuration, security information, and a secondary cell configuration of UE in a target cell.

Step 2: when the second condition is met, the UE or the UE RRC performs the following operations:

considering that the stored handover configuration is invalid, and/or releasing the stored handover configuration.

The second condition is configured by the base station by means of an RRC message, and the RRC message can be a system message or a dedicated RRC message, such as the RRC connection reconfiguration, and can further be a first RRC message including a handover command. Optionally, the second condition can be configured by a target cell or by a source cell.

Based on the measurement events defined in LTE, the second condition can be any combination of one or more of the following events, but is not limited to the following events:

event 1: a signal quality measurement value of a serving cell is better than a threshold;

event 2: a signal quality measurement value of a neighboring cell is worse than a threshold;

event 3: a signal quality measurement value of a serving cell is better than a signal quality measurement value of a neighboring cell by a threshold;

event 4: a signal quality measurement value of a serving cell is better than one threshold, and a signal quality measurement value of a neighboring cell is worse than another threshold;

The neighboring cell in the above event refers to the corresponding target cell in the handover command. Optionally, the serving cell and the target cell in the above event can be of different Radio Access Technologies (RATs). Optionally, the configuration of the second condition or event can be based on the configuration of a measurement event in LTE. For example, when the second condition is configured as event 3, wherein the threshold is configured as th and the Time To Trigger (TTT) value is configured as duration, the UE monitors signal quality of a source cell and a target cell; if the difference between a signal quality measurement value of a serving cell and a signal quality measurement value of a neighboring cell is greater than or equal to th, and it is continued for the duration, the UE considers that the second condition is satisfied.

This embodiment is also applicable to a scenario in which a plurality of handover commands or a plurality of handover target cells are supported. In this scenario, the foregoing operations in this embodiment are performed individually for a handover command or a handover target cell. Specifically, the configuration of the second condition can be configured by each handover target cell, or can be shared by all handover target cells; in the above-mentioned UE operation in this embodiment, when the second condition corresponding to a certain handover target cell is satisfied, the UE performs corresponding operations only for the handover configuration corresponding to the corresponding handover target cell.

Embodiment 3: Base Station Control-Based Handover Configuration Management Method In this embodiment, the UE manages the received or stored handover configuration according to an indication from the base station. That is, when the UE receives a handover command, the UE considers that the corresponding handover configuration is valid; when the UE receives an invalid indication from the base station, the UE considers that the corresponding received or stored handover configuration is invalid, or the UE releases the received or stored handover configuration.

The implementation of this embodiment is described in detail below.

Step 1: when receiving from a source base station a first RRC message including a handover command, the behavior performed by the UE or the UE RRC layer includes storing the received handover configuration.

Optionally, the handover configuration includes all or a part of the configuration in the RRC message including the handover command; or optionally, the handover configuration includes the configuration in the handover command.

Optionally, the handover is a conditional handover, that is, the handover command includes information about a first condition, and when the first condition is met, the UE starts to perform a handover procedure.

For example, the first condition can be a measurement event, for instance, the first condition can be that the signal quality of a neighboring cell is better than that of a serving cell by a threshold for a period of time. The neighboring cell corresponds to the target cell for handover.

Optionally, the handover command includes a combination of one or more of mobility control information of a target cell (such as a cell identifier, a cell frequency, and random access information), system information, as well as a radio resource configuration, a measurement configuration, security information, and a secondary cell configuration of UE in a target cell.

Step 2: indication information is received from the base station. The indication information is used to instruct the UE to cancel the corresponding handover. It can be included in the RRC message or can be MAC signaling.

Step 3: if the received message includes the indication information described in step 2, the UE:

considers that the corresponding stored handover configuration is invalid, and/or releases the corresponding stored handover configuration.

Optionally, prior to step 2, the method further includes the UE reports a measurement result (measurement report) to the base station.

This embodiment is also applicable to a scenario having a plurality of handover commands or a plurality of handover target cells. In this scenario, the above operation is performed individually for a target cell. Specifically, the indication information sent by the base station can optionally comprise a target cell identifier or an identifier that can be associated with a certain handover command or a certain target cell. In this case, the operation in step 3 is performed only for the associated handover command in the indication information or for the handover configuration corresponding to the target cell. In addition, in this scenario, optionally, if the indication information sent by the base station does not include a target cell identifier or does not include an identifier that can be associated with a certain handover command or a certain target cell, the UE performs the operation in step 3 for all handover commands or for handover configurations corresponding to all target cells.

Embodiment 4

Step 1: when receiving from a source base station a first RRC message including a handover command, the behavior performed by the UE or the UE RRC layer includes storing the received handover configuration.

Optionally, the handover configuration includes all or a part of the configuration in the RRC message including the handover command; or optionally, the handover configuration includes the configuration in the handover command.

Optionally, the handover is a conditional handover, that is, the handover command includes information about a first condition, and when the first condition is met, the UE starts to perform a handover procedure.

Optionally, the handover command includes a combination of one or more of mobility control information of a target cell (such as a cell identifier, a cell frequency, and random access information), system information, as well as a radio resource configuration, a measurement configuration, security information, and a secondary cell configuration of UE in a target cell.

Step 2: when it is detected that a Radio Link Failure (RLF) occurs, the UE or the UE RRC layer performs the following operations:
considering that the stored handover configuration is invalid, and/or
releasing the stored handover configuration.

This embodiment is also applicable to a scenario having a plurality of handover commands or a plurality of handover target cells.

Embodiment 5

Step 1: when receiving from a source base station a first RRC message including a handover command, the behavior performed by the UE or the UE RRC layer includes storing the received handover configuration.

Optionally, the handover configuration includes all or a part of the configuration in the RRC message including the handover command; or optionally, the handover configuration includes the configuration in the handover command.

Optionally, the handover is a conditional handover, that is, the handover command includes information about a first condition, and when the first condition is met, the UE starts to perform a handover procedure.

For example, the first condition can be a measurement event, for instance, the first condition can be that the signal quality of a neighboring cell is better than that of a serving cell by a threshold for a period of time. The neighboring cell corresponds to the target cell for handover.

Optionally, the handover command includes a combination of one or more of mobility control information of a target cell (such as a cell identifier, a cell frequency, and random access information), system information, as well as a radio resource configuration, a measurement configuration, security information, and a secondary cell configuration of UE in a target cell.

Step 2: when the UE starts a handover procedure or receives a second RRC message, and the UE has the stored handover configuration thereon, the UE or the UE RRC layer performs the following operations:
considering that the stored handover configuration is invalid, and/or
releasing the stored handover configuration.

The second RRC message is used to release an RRC connection, or is used to indicate that the UE enters an inactive state, or is used to indicate that the UE suspends the RRC connection (RRC suspend). Further, the second RRC message can be an RRC connection reconfiguration message or an RRC connection release message. It should be noted that the inactive state herein refers to a state between an RRC connected state and an RRC idle state, and the name of this state has not been determined in the NR. Sometimes this state can be referred to as a new state. This new state can be an independent RRC state, or can be a sub-state of the RRC connected or RRC idle state. Other forms of commands and definitions of this state are within the scope of the present application for the purposes of the present application.

This embodiment is also applicable to a scenario in which a plurality of handover commands or a plurality of handover target cells are supported. In this scenario, the foregoing operations in this embodiment are performed individually for a handover command or a handover target cell. Specifically, the configuration of the second condition can be configured by each handover target cell, or can be shared by all handover target cells; in the above-mentioned UE operation in this embodiment, when the second condition corresponding to a certain handover target cell is satisfied, the UE performs corresponding operations only for the handover configuration corresponding to the corresponding handover target cell.

Embodiment 6

Step 1: when receiving from a source base station a first RRC message including a handover command, the behavior performed by the UE or the UE RRC layer includes storing the received handover configuration.

Optionally, the handover configuration includes all or a part of the configuration in the RRC message including the handover command; or optionally, the handover configuration includes the configuration in the handover command.

Optionally, the handover is a conditional handover, that is, the handover command includes information about a first condition, and when the first condition is met, the UE starts to perform a handover procedure.

For example, the first condition can be a measurement event, for instance, the first condition can be that the signal quality of a neighboring cell is better than that of a serving cell by a threshold for a period of time. The neighboring cell corresponds to the target cell for handover.

Optionally, the handover command includes a combination of one or more of mobility control information of a target cell (such as a cell identifier, a cell frequency, and random access information), system information, as well as a radio resource configuration, a measurement configuration, security information, and a secondary cell configuration of UE in a target cell.

Step 2: when the UE receives another first RRC message including a handover command, and the UE has the stored handover configuration thereon, the UE or the UE RRC layer performs the following operations:

considering that the stored handover configuration is invalid, and/or releasing the stored handover configuration.

The UE operation in this step can also be: replacing the stored handover configuration with the handover configuration in the received another first RRC message.

Embodiment 7

Step 1: when receiving from a source base station a first RRC message including a handover command, the behavior performed by the UE or the UE RRC layer includes storing the received handover configuration.

Optionally, the handover configuration includes all or a part of the configuration in the RRC message including the handover command; or optionally, the handover configuration includes the configuration in the handover command.

Optionally, the handover is a conditional handover, that is, the handover command includes information about a first condition, and when the first condition is met, the UE starts to perform a handover procedure.

For example, the first condition can be a measurement event, for instance, the first condition can be that the signal quality of a neighboring cell is better than that of a serving cell by a threshold for a period of time. The neighboring cell corresponds to the target cell for handover.

Optionally, the handover command includes a combination of one or more of mobility control information of a target cell (such as a cell identifier, a cell frequency, and random access information), system information, as well as a radio resource configuration, a measurement configuration, security information, and a secondary cell configuration of UE in a target cell.

Step 2: if the handover of the UE successfully complete, the UE or the UE RRC layer performs the following operations:

considering that the stored handover configuration is invalid, and/or releasing the stored handover configuration.

The successful completion of the handover of the UE can be characterized in that the UE sends (successfully) a handover complete message, namely, an RRC connection reconfiguration complete message, to the target cell.

Embodiment 8: Handover Configuration Management Method at the Base Station Side

Corresponding to Embodiment 1, this embodiment is implemented on a source base station in a handover. For example, this embodiment can be implemented by the base station shown in FIG. 5.

Step 1: an RRC message is delivered to UE, wherein the RRC message includes a configuration of a validity timer. The RRC message can be a first RRC message including a handover command. The validity timer is used for managing a handover configuration. For example, the RRC message can be delivered to the UE by the sending unit 510 in the base station 500 shown in FIG. 5.

Optionally, the handover configuration includes all or a part of the configuration in the RRC message including the handover command; or optionally, the handover configuration includes the configuration in the handover command.

Optionally, the handover is a conditional handover, that is, the handover command includes information about a first condition, and when the first condition is met, the UE starts to perform a handover procedure.

For example, the first condition can be a measurement event, for instance, the first condition can be that the signal quality of a neighboring cell is better than that of a serving cell by a threshold for a period of time. The neighboring cell corresponds to the target cell for handover.

Optionally, the handover command includes a combination of one or more of mobility control information of a target cell (such as a cell identifier, a cell frequency, and random access information), system information, as well as a radio resource configuration, a measurement configuration, security information, and a secondary cell configuration of UE in a target cell.

Optionally, step 2: when the timer expires, the corresponding handover is stopped or canceled. For example, the corresponding handover can be stopped or canceled by the handover management unit 520 in the base station 500 shown in FIG. 5.

Similarly, this embodiment can be applied to a scenario having a plurality of handover commands or a plurality of handover target cells. In this scenario, the validity timer and/or its value can be shared by a plurality of handover commands or a plurality of target cells, or can be configured to be distinguishable for each handover command or target cell. In this scenario, the configuration and the steps in this embodiment are both configured to be distinguishable for a handover command or a target cell, that is, only related operations are performed for the corresponding target cell or the associated target cell.

Prior to step 1, the method optionally includes: receiving, from a target cell, a handover acknowledgment message, wherein the handover acknowledgment message includes a configuration of a validity timer, and the message is an X2/Xn message, and X2/Xn is an interface between base stations and can have other names. That is, in this case, the timer is configured by the target cell. For example, a handover acknowledgment message can be received from the target cell by the receiving unit 530 in the base station 500 shown in FIG. 5.

Same as Embodiment 1, the foregoing method in this embodiment is also applicable to a non-handover scenario, such as UE-based mobility, and further, such as cell reselection. The following embodiments are described in combination with the UE-based mobility.

In an embodiment, the base station sends a cell reselection configuration to the UE, wherein the cell reselection parameter is sent through dedicated signaling, such as an RRC connection release message, an RRC connection reconfiguration message, and the like. The UE performs cell reselection according to the received cell reselection configuration. The cell reselection occurs in an RRC idle state or an RRC inactive state. The UE manages the received cell reselection configuration on the basis of the validity timer. The validity timer can be configured by broadcast signaling or by dedicated signaling. Further, the validity timer can be included in the cell reselection configuration to be configured for the UE together with the cell reselection configuration through dedicated signaling. The cell reselection configuration is used for UE-based mobility, and is further used for cell reselection, and the name of the cell reselection configuration can also be other names such as idle state mobility control information or inactive state mobility control information.

Embodiment 9

Corresponding to Embodiment 2, this embodiment is implemented on a source base station in a handover. For example, this embodiment can be implemented by the base station shown in FIG. 5.

Step 1: an RRC message is delivered to UE, wherein the RRC message includes a configuration of a second condition. The RRC message can be a first RRC message including a handover command. The second condition is used to determine whether the handover configuration is valid, or is used to determine whether to release the handover configuration. For example, the RRC message can be delivered to the UE by the sending unit 510 in the base station 500 shown in FIG. 5.

Optionally, the handover is a conditional handover, that is, the handover command includes information about a first condition, and when the first condition is met, the UE starts to perform a handover procedure.

Optionally, the handover configuration includes all or a part of the configuration in the RRC message including the handover command; or optionally, the handover configuration includes the configuration in the handover command.

Optionally, the handover command includes a combination of one or more of mobility control information of a target cell (such as a cell identifier, a cell frequency, and random access information), system information, as well as a radio resource configuration, a measurement configuration, security information, and a secondary cell configuration of UE in a target cell.

Optionally, this embodiment includes step 2, and the base station stops or cancels the corresponding handover when a second condition is met. The second condition being met can be a determination made according to a measurement report of the UE. The measurement report of the UE is a measurement report that is triggered by the UE and sent by the UE to the base station when the configured second condition is met.

Similarly, this embodiment can be applied to a scenario having a plurality of handover commands or a plurality of handover target cells. In this scenario, the configuration of the second condition can be shared by a plurality of handover commands or a plurality of target cells, or can be configured to be distinguishable for each handover command or target cell. In this scenario, the configuration and the steps in this embodiment are both configured to be distinguishable for a handover command or a target cell, that is, only related operations are performed for the corresponding target cell or the associated target cell.

Prior to step 1, the method optionally includes: receiving, from a target cell, a handover acknowledgment message, wherein the handover acknowledgment message includes a configuration of a second condition, and the message is an X2/Xn message, and X2/Xn is an interface between base stations and can have other names. That is, in this case, the second condition is configured by the target cell. For example, a handover acknowledgment message can be received from the target cell by the receiving unit 530 in the base station 500 shown in FIG. 5.

Embodiment 10

Corresponding to Embodiment 3, this embodiment is implemented on a source base station in a handover.

Step 1: an indication information is delivered to UE. The indication information is used to instruct the UE to cancel the corresponding handover. It can be included in the RRC message or can be MAC signaling. In another expression, the UE information is used to instruct the UE to release the corresponding handover configuration.

Optionally, the handover is a conditional handover, that is, the handover command includes information about a first condition, and when the first condition is met, the UE starts to perform a handover procedure.

For example, the first condition can be a measurement event, for instance, the first condition can be that the signal quality of a neighboring cell is better than that of a serving cell by a threshold for a period of time. The neighboring cell corresponds to the target cell for handover.

Optionally, the handover configuration includes all or a part of the configuration in the RRC message including the handover command; or optionally, the handover configuration includes the configuration in the handover command.

Optionally, the handover command includes a combination of one or more of mobility control information of a target cell (such as a cell identifier, a cell frequency, and random access information), system information, as well as a radio resource configuration, a measurement configuration, security information, and a secondary cell configuration of UE in a target cell.

Optionally, prior to step 1, the method further includes receiving a measurement result (measurement report) reported by the UE.

Optionally, after step 1, the method further includes step 2: receiving a response message/signaling from the UE.

This embodiment is also applicable to a scenario having a plurality of handover commands or a plurality of handover target cells. In this scenario, the above operation is performed individually for a target cell. Specifically, the indication information delivered by the base station can optionally include a target cell identifier or an identifier that can be associated with a certain handover command or a certain target cell.

The following embodiments are provided to illustrate a handover configuration management method at the base station side, which is performed on a target base station in a handover. For example, this embodiment can be implemented by the base station shown in FIG. 5.

Embodiment 11

Corresponding to Embodiment 1, this embodiment is implemented on a target base station in a handover.

Step 1: a handover acknowledgment message is sent to a source base station, wherein the handover acknowledgment message includes a configuration of a validity timer, and the message is an X2/Xn message, and X2/Xn is an interface between base stations and can have other names. That is, in this case, the timer is configured by the target cell. Optionally, the timer may be included in an inter-node RRC (inter-node RRC) message in the handover acknowledgment message. The validity timer is used for managing a handover configuration. For example, the handover acknowledgment message can be sent to the source base station by the sending unit 510 in the base station 500 shown in FIG. 5.

Optionally, the handover configuration includes all or a part of the configuration in the RRC message including the handover command; or optionally, the handover configuration includes the configuration in the handover command.

Optionally, the handover is a conditional handover, that is, the handover command includes information about a first condition, and when the first condition is met, the UE starts to perform a handover procedure. For example, the first condition can be a measurement event, for instance, the first condition can be that the signal quality of a neighboring cell is better than that of a serving cell by a threshold for a period of time. The neighboring cell corresponds to the target cell for handover.

Optionally, the handover command includes a combination of one or more of mobility control information of a target cell (such as a cell identifier, a cell frequency, and random access information), system information, as well as a radio resource configuration, a measurement configuration, security information, and a secondary cell configuration of UE in a target cell.

Optionally, step 2: when the timer expires, the corresponding handover is stopped or canceled. For example, the corresponding handover can be stopped or canceled by the handover management unit 520 in the base station 500 shown in FIG. 5.

Optionally, prior to step 1, the method further includes receiving a handover request message from the source base station.

Similarly, this embodiment can be applied to a scenario having a plurality of handover commands or a plurality of handover target cells. In this scenario, the validity timer and/or its value can be shared by a plurality of handover commands or a plurality of target cells, or can be configured to be distinguishable for each handover command or target cell. In this scenario, the configuration and the steps in this embodiment are both configured to be distinguishable for a handover command or a target cell, that is, only related operations are performed for the corresponding target cell or the associated target cell.

Embodiment 12

Corresponding to Embodiment 2, this embodiment is implemented on a target base station in a handover.

Step 1: a handover acknowledgment message is sent to the source base station, wherein the handover acknowledgment message includes a configuration of a second condition, and the message is an X2/Xn message, and X2/Xn is an interface between base stations and can have other names. That is, in this case, the second condition is configured by the target cell. Optionally, the configuration of the second condition can be included in an inter-node RRC message in the handover acknowledgment message. The second condition is used to determine whether the handover configuration is valid, or is used to determine whether to release the handover configuration.

Optionally, the handover is a conditional handover, that is, the handover command includes information about a first condition, and when the first condition is met, the UE starts to perform a handover procedure. For example, the first condition can be a measurement event, for instance, the first condition can be that the signal quality of a neighboring cell is better than that of a serving cell by a threshold for a period of time. The neighboring cell corresponds to the target cell for handover.

Optionally, the handover configuration includes all or a part of the configuration in the RRC message including the handover command; or optionally, the handover configuration includes the configuration in the handover command.

Optionally, the handover command includes a combination of one or more of mobility control information of a target cell (such as a cell identifier, a cell frequency, and random access information), system information, as well as a radio resource configuration, a measurement configuration, security information, and a secondary cell configuration of UE in a target cell.

Optionally, prior to step 1, the method further includes receiving a handover request message from the source base station.

Similarly, this embodiment can be applied to a scenario having a plurality of handover commands or a plurality of handover target cells. In this scenario, the configuration of the second condition can be shared by a plurality of handover commands or a plurality of target cells, or can be configured to be distinguishable for each handover command or target cell. In this scenario, the configuration and the steps in this embodiment are both configured to be distinguishable for a handover command or a target cell, that is, only related operations are performed for the corresponding target cell or the associated target cell.

The following embodiment provides a method for indicating/acquiring a conditional handover capability on an air interface.

Embodiment 13

UE reports to the base station its capability information about supporting a conditional handover.

The conditional handover means that a handover command includes information about a first condition, and when the first condition is met, the UE starts to perform a handover procedure. For example, the first condition can be a measurement event, for instance, the first condition can be that the signal quality of a neighboring cell is better than that of a serving cell by a threshold for a period of time. The neighboring cell corresponds to the target cell for handover.

The capability information of the UE about supporting a conditional handover can be included in a UE capability information message, or can be implemented by other means, for example, by an explicit or implicit indication in other RRC messages. The format is, for example:

| | |
|---|---|
| Conditionalhandover-rxx OPTIONAL, | ENUMERATED{supported} |

The base station determines, according to above capability information of the UE, whether to perform a conditional handover for mobility of the UE.

In another embodiment, the UE reports to the base station its capability for supporting UE-based mobility. The UE-based mobility can be cell reselection in an RRC connected state. It can also refer to a conditional handover in the above RRC connected state.

The capability information of the UE about supporting UE-based mobility can be included in a UE capability information message. or can be implemented by other means, for example, by an explicit or implicit indication in other RRC messages. The format is, for example:

| | |
|---|---|
| UE-based mobility-rxx OPTIONAL, or | ENUMERATED{supported} |
| Connected-cell-reselection-rxx OPTIONAL, | ENUMERATED{supported} |

The base station considers, according to above capability information of the UE, whether to perform UE-based mobility for the UE.

The following embodiment is used to explain a method for indicating/acquiring a conditional handover capability on X2/Xn.

Embodiment 14

A first base station can indicate to a second base station whether the first base station supports a conditional handover. The indication information is carried in an X2/Xn message, and can be, for example, an X2/Xn setup/eNB configuration update message. X2/Xn is an interface between base stations and can have other names in other systems.

The conditional handover means that a handover command includes information about a first condition, and when the first condition is met, the UE starts to perform a handover procedure. For example, the first condition can be a measurement event, for instance, the first condition can be that the signal quality of a neighboring cell is higher than that of a serving cell by a threshold for a period of time. The neighboring cell corresponds to the target cell for handover.

In another implementation of this embodiment, the source base station indicates, in a handover request message of a handover preparation procedure, to the target base station that the current handover is a conditional handover, and the indication information is carried in the X2/Xn message. The target base station can perform configuration in a message such as a handover command or a handover response based on this indication, such as the timer described in Embodiment 1.

In another implementation of this embodiment, the target base station indicates, in a handover acknowledgment message of the handover preparation procedure, to the source base station that the current handover is a conditional handover, and the indication information is carried in the X2/Xn message. The source base station can perform corresponding operations for the UE based on this indication, such as determining whether to maintain communication with the UE after the handover command is delivered.

The following embodiment is used to describe a method of performing a handover at the UE side.

Embodiment 15

Step 1: when receiving from a source base station a first RRC message including a handover command, the behavior performed by the UE or the UE RRC layer includes storing the received handover configuration.

Optionally, the handover is a conditional handover, that is, the handover command includes information about a first condition, and when the first condition is met, the UE starts to perform a handover procedure. For example, the first condition can be a measurement event, for instance, the first condition can be that the signal quality of a neighboring cell is better than that of a serving cell by a threshold for a period of time. The neighboring cell corresponds to the target cell for handover.

Optionally, the handover configuration includes all or a part of the configuration in the RRC message including the handover command; or optionally, the handover configuration includes the configuration in the handover command.

Optionally, the handover command includes a combination of one or more of mobility control information of a target cell (such as a cell identifier, a cell frequency, and random access information), system information, as well as a radio resource configuration, a measurement configuration, security information, and a secondary cell configuration of UE in a target cell.

Step 2: When the first condition is met, the UE sends a handover indication to the base station, wherein the handover indication is used to inform the base station that the UE is about to start performing a handover; it can also be described as that the handover indication is used to inform the base station that the handover occurs, or described as notifying the base station that the first condition is met.

Step 3: the UE performs the handover, that is, the UE is synchronized to and accesses the target cell. In this step, the UE applies the configuration in the stored handover command to access the target cell. This step is optional.

Optionally, after step 2 and/or before step 3, the method further includes step 2A: the UE receives a response from the base station.

In an embodiment, whether the UE can or needs to send a handover indication after the first condition is met is configured by the base station. That is, the base station uses an RRC message to enable or disable the transmission of the handover indication, and the RRC message can be a system message or an RRC message including a handover command.

For the implementation of step 2 and step 2A in this embodiment, the following embodiments 16 to 19 provide some descriptions. It should be noted that its implementations are not limited to those listed in the embodiments 16 to 19.

Embodiment 16

In this embodiment, the handover indication in step 2 in Embodiment 15 is in the form of MAC signaling, that is, the handover indication is a MAC Control Element (CE). The following MAC layer can also be referred to as a MAC entity.

In an embodiment, when the first condition in step 1 of Embodiment 15 is satisfied, a UE RRC layer instructs a lower layer to send a handover indication to a base station. The base station here refers to a source base station.

In an embodiment, when an indication to send a handover indication is received from an upper layer, the UE MAC layer triggers transmission of a handover indication MAC CE.

In an embodiment, the handover indication MAC CE corresponds to a dedicated Logical Channel Identity (LCID).

Figure 3:
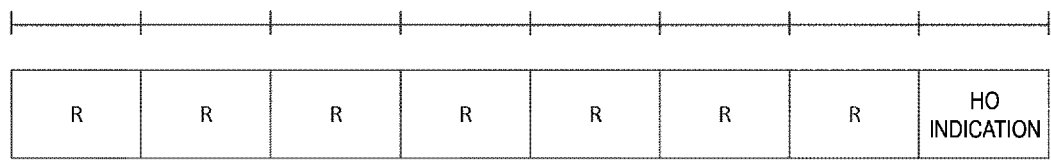
FIG. 3 is a schematic diagram illustrating an example format of a MAC CE.

The handover indication MAC CE may have multiple formats depending on its different content and sizes. Descriptions of some formats are provided in the following embodiments, and it should be noted that the following are merely examples and the formats are not limited thereto. In an embodiment, the format can include one bit to indicate whether the UE is about to be handed over to the target cell, or to inform the base station that the first condition has been met. In another embodiment, the format can include a cell identifier, used to indicate a target cell to which the UE is about to be handed over, i.e., a target cell that triggers the UE to start a handover, i.e., a target cell that has met the first condition. In this embodiment, the number of cell identifiers can be one or multiple, and the cell identifier can also be a base station identifier, a beam identifier, a transmission point (Transmission Point or Transmission and Reception Point), a TRP identifier, or the like. In another embodiment, the format can be a bitmap, and each bit corresponds to a handover target cell or a handover command, and a value of a bit indicates whether a target cell corresponding to the bit triggers a handover, for example, "0" indicates No, and "1" indicates Yes. In the above embodiment, in the handover indication MAC CE, in except valid bits, the other bits can be reserved bits. FIG. 3 shows an example of a MAC CE format, with R being a reserved bit, and HO indication being a valid bit of a handover indication.

In an embodiment, when the MAC layer triggers the transmission of the handover indication MAC CE, the UE MAC performs the following operations:

If there is an uplink resource allocated for new transmission in the MAC entity of the current TTI, the MAC entity will: if a handover indication procedure considers that a handover indication is triggered and is not canceled, and if the allocated uplink resource can accommodate a handover indication MAC CE and its corresponding MAC sub-header according to a result of a logical channel prioritization procedure, command a multiplexing combination procedure to generate and send a handover indication MAC CE.

In an embodiment, when the MAC layer triggers the transmission of the handover indication MAC CE, the UE MAC performs the following operations:

If a handover indication procedure considers that a handover indication is triggered and is not canceled, the MAC entity will: if there is an uplink resource allocated for new transmission in the MAC entity of the TTI, command a multiplexing combination procedure to generate and send a handover indication MAC CE; or if there is no allocated or configured uplink grant, trigger a scheduling request.

In an embodiment, in one or more of the following situations, if a triggered handover indication is sent, the MAC layer will cancel the triggered transmission of the handover indication MAC CE:

when an indication to cancel transmission of a handover indication is received from an upper layer;
when MAC is reset; and
when a handover indication MAC CE is included in a MAC PDU to be sent.

In an embodiment, when a validity timer stops or expires, the RRC instructs the MAC layer to cancel the transmission of the handover indication. The validity timer is shown in Embodiment 1.

In an embodiment, for step 2A in Embodiment 15, a response to the handover indication MAC CE can be an HARQ ACK/NACK or a specific MAC CE. The specific MAC CE is configured to confirm the to-be-performed handover in response to a handover indication sent by the UE. Optionally, the response MAC CE can further include other information, such as a cell identifier, for indicating the target cell for the handover. The cell identifier can also be a beam identifier, a base station identifier, and a TRP identifier. The response MAC CE including the cell information can correspond to the case where one or more cell identifiers are included in the handover indication sent by the UE.

In an embodiment, the UE starts a handover to a target cell when one or more of the following situations occurs:
when the handover indication MAC CE is sent; and
when a response to the handover indication MAC CE is received.

In an embodiment, the UE MAC indicates to an upper layer that transmission of a handover indication is completed, and the UE RRC performs a handover to a target cell when receiving a handover indication sending complete information from a lower layer.

Optionally, the UE performs a handover to a target cell, including starting downlink synchronization to the target cell, resetting the MAC, reestablishing the PDCP/RLC (optional), and the like. The specific operation of the UE to perform a handover to a target cell is based on the corresponding operation of the handover in the LTE system, and details are not described herein again.

Optionally, the UE considers that the target cell is a cell that meets the associated first condition and triggers a handover, or the UE considers that the target cell is the cell corresponding to the cell identifier carried in the response information corresponding to the handover indication MAC CE.

Embodiment 17

In this embodiment, the handover indication in step 2 in Embodiment 15 is in the form of MAC signaling. Unlike Embodiment 16, the MAC signaling is not a MAC CE but a MAC sub-header, that is, the MAC sub-header for the handover indication does not have a corresponding MAC Service Data Unit (SDU) or MAC CE in the MAC payload behind the MAC header. The following MAC layer can also be referred to as a MAC entity.

In an embodiment, when the first condition in step 1 of Embodiment 15 is satisfied, the UE RRC layer instructs the lower layer to send a handover indication to the base station. The base station here refers to a source base station.

In an embodiment, when an indication to send a handover indication is received from an upper layer, the UE MAC layer triggers transmission of handover indication MAC signaling.

In an embodiment, the handover indication MAC signaling corresponds to a dedicated Logical Channel Identity LCID.

Figure 4:
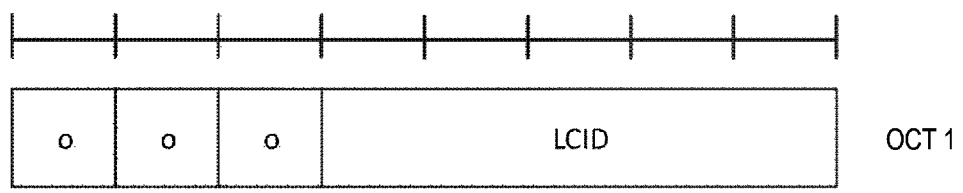
FIG. 4 is a schematic diagram illustrating an example format of a MAC sub-header.

The handover indication MAC signaling may have multiple formats depending on its different content and sizes. Descriptions of some formats are provided in the following embodiments, and it should be noted that the following are merely examples and the formats are not limited thereto. In an embodiment, the format can include one bit to indicate whether the UE is about to be handed over to the target cell, or to inform the base station that the first condition has been met. In another implementation, the format can include a cell identifier, used to indicate a target cell to which the UE is about to be handed over, i.e., a target cell that triggers the UE to start a handover, i.e., a target cell that has met the first condition. In this embodiment, the number of cell identifiers can be one or multiple, and the cell identifier can also be a base station identifier, a beam identifier, a TRP identifier, or the like. In another embodiment, the format can be a bitmap, and each bit corresponds to a handover target cell or a handover command, and a value of a bit indicates whether a target cell corresponding to the bit triggers a handover, for example, "0" indicates No, and "1" indicates Yes. In the above embodiment, in the handover indication MAC signaling, except valid bits, the other bits can be R/E/F/L bits. FIG. 4 shows an example of a format of the MAC sub-header, in which the o bit can be the R/E/F/L bit, and the R/E/F/L bit has the same definition as that in the MAC sub-header of the LTE system, and details are not described herein again.

In an embodiment, when the MAC layer triggers the transmission of the handover indication MAC sub-header, the UE MAC performs the following operations:

If there is an uplink resource allocated for new transmission in the MAC entity of the current TTI, the MAC entity will: if a handover indication procedure considers that a handover indication is triggered and is not canceled, and if the allocated uplink resource can accommodate a handover indication MAC sub-header according to a result of a logical channel prioritization procedure, command a multiplexing combination procedure to generate and send a handover indication MAC sub-header.

In an embodiment, when the MAC layer triggers the transmission of the handover indication MAC sub-header, the UE MAC performs the following operations:

If a handover indication procedure considers that a handover indication is triggered and is not canceled, the MAC entity will: if there is an uplink resource allocated for new transmission in the MAC entity of the TTI, command a multiplexing combination procedure to generate and send a handover indication MAC sub-header; or if there is no allocated or configured uplink grant, trigger a scheduling request.

In an embodiment, in one or more of the following situations, if a triggered handover indication is sent, the MAC layer will cancel the triggered transmission of the handover indication MAC sub-header:

when an indication to cancel transmission of a handover indication is received from an upper layer;
when MAC is reset; and
when a handover indication MAC sub-header is included in a MAC PDU to be sent.

In an embodiment, when a validity timer stops or expires, the RRC instructs the MAC layer to cancel the transmission of the handover indication. The validity timer is shown in Embodiment 1.

In an embodiment, for step 2A in Embodiment 15, a response to the handover indication MAC sub-header can be an HARQ ACK/NACK or a specific MAC CE. The specific MAC CE is configured to confirm the to-be-performed handover in response to a handover indication sent by the UE. Optionally, the response MAC CE can further include other information, such as a cell identifier, for indicating the target cell for the handover. The cell identifier can also be a beam identifier, a base station identifier, and a TRP identifier. The response MAC CE including the cell information can correspond to the case where one or more cell identifiers are included in the handover indication sent by the UE.

In an embodiment, the UE starts a handover to a target cell when one or more of the following situations occurs:

when the handover indication MAC sub-header is sent;
when a response to the handover indication MAC sub-header is received.

In an embodiment, the UE MAC indicates to an upper layer that transmission of a handover indication is completed, and the UE RRC performs a handover to a target cell when receiving a handover indication sending complete information from a lower layer.

Optionally, the UE performs a handover to a target cell, including starting downlink synchronization to the target cell, resetting the MAC, reestablishing the PDCP/RLC (optional), and the like. The specific operation of the UE to perform a handover to a target cell is based on the corresponding operation of the handover in the LTE system, and details are not described herein again.

Optionally, the UE considers that the target cell is a cell that meets the associated first condition and triggers a handover, or the UE considers that the target cell is the cell corresponding to the cell identifier carried in the response information corresponding to the handover indication MAC sub-header.

Embodiment 18

In this embodiment, the handover indication in step 2 in Embodiment 15 is in the form of RRC signaling.

In an embodiment, when the first condition in step 1 of Embodiment 15 is satisfied, the UE RRC sends a handover indication to the base station. The base station here refers to a source base station.

Descriptions of some handover indications are provided in the following embodiments, and it should be noted that the following are merely examples and the handover indications are not limited thereto. In an embodiment, the handover indication can include one bit to indicate whether the UE is about to be handed over to the target cell, or to indicate that the first condition has been met. In another implementation, the handover indication can include a cell identifier, used to indicate a target cell to which the UE is about to be handed over, i.e., a target cell that triggers the UE to start a handover, i.e., a target cell that has met the first condition. In this embodiment, the number of cell identifiers can be one or multiple, and the cell identifier can also be a base station identifier, a beam identifier, a TRP identifier, or the like. In another embodiment, the handover indication can be a bitmap, and each bit corresponds to a handover target cell or a handover command, and a value of a bit indicates whether a target cell corresponding to the bit triggers a handover, for example, "0" indicates No, and "1" indicates Yes. The foregoing handover indication can be a single RRC message, and can also be an IE in other RRC messages.

In an embodiment, when the RRC layer triggers transmission of a handover indication message, the RRC layer delivers the handover indication message to the lower layer for transmission.

In an embodiment, for step 2A in Embodiment 15, a response to the handover indication can be RRC signaling, and can also be a specific MAC CE. The response to the handover indication is used to confirm the to-be-performed handover in response to the handover indication sent by the UE. Optionally, the response can further include other information, such as a cell identifier, for indicating the target cell for the handover. The cell identifier can also be a beam identifier, a base station identifier, and a TRP identifier. The response including the cell information can correspond to the case where one or more cell identifiers are included in the handover indication sent by the UE.

In an embodiment, the UE starts a handover to a target cell when one or more of the following situations occurs:

when the handover indication is sent; and
when a response to the handover indication is received.

Optionally, the UE performs a handover to a target cell, including starting downlink synchronization to the target cell, resetting the MAC, reestablishing the PDCP/RLC (optional), and the like. The specific operation of the UE to perform a handover to a target cell is based on the corresponding operation of the handover in the LTE system, and details are not described herein again.

Optionally, the UE considers that the target cell is a cell that meets the associated first condition and triggers a handover, or the UE considers that the target cell is the cell corresponding to the cell identifier carried in the response information corresponding to the handover indication message.

Embodiment 19

In this embodiment, the handover indication in step 2 in Embodiment 15 is in the form of layer 1 (L1) signaling.

In an embodiment, when the first condition in step 1 of Embodiment 15 is satisfied, the UE RRC triggers the L1 to send an L1 handover indication to the base station. The base station here refers to a source base station.

In an embodiment, the handover indication signaling can be a specific scheduling request, which uses a specific physical time-frequency resource or employs a specific code sequence. The term "specific" is used to be distinguished from scheduling requests typically for requesting an uplink grant.

In an embodiment, the L1 handover indication can be a preamble. The preamble can be a specific preamble allocated by the system for handover indication purposes, for instance, by the system information. In another embodiment, the preamble used by the UE to send a handover indication can be allocated by the base station in an RRC message including a handover command.

In an embodiment, for step 2A in Embodiment 15, a response to the handover indication can be RRC signaling, and can also be a specific MAC CE. The response to the handover indication is used to confirm the to-be-performed handover in response to the handover indication sent by the UE. Optionally, the response can further include other information, such as a cell identifier, for indicating the target cell for the handover. The cell identifier can also be a beam identifier, a base station identifier, and a TRP identifier. The response including the cell information can correspond to the case where one or more cell identifiers are included in the handover indication sent by the UE.

As described in Embodiment 15, step 2A is optional, that is, the UE does not need to wait for a response message resulting from receiving of the handover indication.

In an embodiment, the UE starts a handover to a target cell when one or more of the following situations occurs:
when the handover indication is sent; and
when a response to the handover indication is received.

Optionally, the UE performs a handover to a target cell, including starting downlink synchronization to the target cell, resetting the MAC, reestablishing the PDCP/RLC (optional), and the like. The specific operation of the UE to perform a handover to a target cell is based on the corresponding operation of the handover in the LTE system, and details are not described herein again.

Optionally, the UE considers that the target cell is a cell that meets the associated first condition and triggers a handover, or the UE considers that the target cell is the cell corresponding to the cell identifier carried in the response information corresponding to the handover indication message.

Embodiment 20: Method of Performing a Handover at the Base Station Side

This embodiment can be implemented by the base station 500 shown in FIG. 5.

Step 1: receive a handover indication message sent by UE. The handover indication message can also be described as handover indication information or a message including handover indication information. The handover indication is used to inform the base station that the UE is about to start performing a handover, that is, the handover indication is used to inform the base station that the handover occurs. Examples of the handover indication message are shown in Embodiments 16 to 19, but are not limited thereto. For example, this step can be performed by the receiving unit 530 in the base station 500 shown in FIG. 5.

Step 2: send a response message to the UE. The response message is used to respond to the handover indication sent by the UE, that is, confirm the handover. Examples are shown in Embodiments 16 to 19, but are not limited thereto. As described above, step 2 is optional. For example, this step can be performed by the sending unit 510 in the base station 500 shown in FIG. 5.

Optionally, the handover is a conditional handover, that is, the handover command includes information about a first condition, and when the first condition is met, the UE starts to perform a handover procedure. For example, the first condition can be a measurement event, for instance, the first condition can be that the signal quality of a neighboring cell is higher than that of a serving cell by a threshold for a period of time. The neighboring cell corresponds to the target cell for handover.

Step 3: cease data transmission and communication with the UE. Once the base station is informed by means of the foregoing steps that the UE is about to start a handover to the target cell, the base station ceases data transmission with the UE to avoid waste of resources caused by unnecessary data transmission/data loss. For example, this step can be performed by the handover management unit 520 in the base station 500 shown in FIG. 5.

Step 4: start to perform data forwarding to the target cell. Once the base station is informed by the foregoing steps that the UE is about to start a handover to the target cell, the base station triggers forwarding, to the target cell through the X2/Xn interface, the uplink or downlink data that has not been sent or has not been successfully acknowledged. X2/Xn here is a logical interface between base stations, and there can be other commands in different systems or scenarios. This application is not limited to this name. For example, this step can be performed by the handover management unit 520 in the base station 500 shown in FIG. 5.

Steps 3 and 4 above are both optional. The order of performing the above steps is not limited in the present application.

Embodiment 21

The configuration method of the first condition for the handover in the above embodiment is described in this embodiment.

In an embodiment, the configuration of the first condition is included in the measurement configuration Information Element (IE) as other measurement configurations. For example, the measurement configuration in LTE is included in the measconfig IE, including the corresponding measurement object (measobject), report configuration (reportconfig), measurement identifier (measID), and the like. Optionally, unlike the measurement configuration in the existing mechanism, the reportamount, reportinterval, and maxreportcell parameters are not included in the report configuration. The first RRC message comprising a handover command includes a measID, as included in the mobility control information IE. Basing on the measID, the UE can know that the measurement configuration corresponding to the measID in the measurement configuration IE is for the first condition. For ease of understanding, examples are provided as follows. The first RRC message comprising a handover command includes a measurement configuration IE and a mobility control information IE, and the measurement configuration IE comprises measurement configurations with measIDs of 1, 2, and 3. If the mobility control information IE includes the measID of 2, the UE considers that the handover is based on the first condition, and the configuration of the first condition is a configuration corresponding to the measID of 2. Optionally, if the configuration with a measID of 2 in the measurement configuration IE is for the first condition, the UE does not need to perform measurement reporting.

In another embodiment, the configuration of the first condition is included in the measurement configuration IE as other measurement configurations. For example, the measurement configuration in LTE is included in the measconfig IE, including the corresponding measurement object (measobject), report configuration (reportconfig), measurement identifier (measID), and the like. Optionally, unlike the measurement configuration in the existing mechanism, the reportamount, reportinterval, and maxreportcell parameters are not included in the report configuration. A target cell identifier is included in the report configuration or the measurement object configuration or the measurement identifier configuration, and the target cell identifier is consistent with the target cell identifier in the mobility control IE. On the basis that the target cell identifier is included in the report configuration or in the measurement object or in the measurement identifier configuration, the UE considers that the measurement configuration corresponding to the report configuration or the measurement object configuration or the measurement identifier is used as the first condition.

In another embodiment, the indication information can be included in the report configuration or the measurement object configuration or the measurement identifier configuration, through which the UE considers that the measurement configuration corresponding to the reporting configuration or the measurement object configuration or the measurement identifier is used as the first condition. The indication information can be of an enumerated type or a boolean type, such as

| conditionalhandover | ENUMERATED{true}. |
|---|---|

In another embodiment, indication information is included in an RRC message including a handover command, and is particularly included in the mobility control IE, and the UE considers, on the basis of the indication information, that the handover is performed based on the first condition, that is, the handover is performed after the first condition is satisfied. The indication information can be of an enumerated type or a boolean type, such as

| conditionalhandover | ENUMERATED{true}. |
|---|---|

Embodiment 22: L2 Processing Method in a Handover

This embodiment relates to the UE side, and provides a method used by UE to process L2 according to an indication of a base station.

Step 1: receiving an RRC message that comprising a handover command sent by the base station.

Step 2: L2 is processed according to the RRC message or the handover command in step 1.

For step 2, in an embodiment, if the RRC message or the handover command indicates that the PDCP does not need to be reestablished, the UE does not reestablish the PDCP when using the configuration in the handover command to perform the handover. In an embodiment, if the RRC message or the handover command indicates that RLC does not need to be reestablished, the UE does not reestablish RLC when using the configuration in the handover command to perform the handover. In an embodiment, if the RRC message or the handover command indicates that L2 does not need to be reestablished, the UE does not reestablish the PDCP and RLC when applying the configuration in the handover command to perform the handover. In an embodiment, if the RRC message or the handover command indicates that the PDCP is reestablished, the UE reestablishes the PDCP when applying the configuration in the handover command to perform the handover. In an embodiment, if the RRC message or the handover command indicates that RLC is reestablished, the UE reestablishes RLC when applying the configuration in the handover command to perform the handover. In an embodiment, if the RRC message or the handover command indicates that L2 is reestablished, the UE reestablishes the PDCP and RLC when applying the configuration in the handover command to perform the handover. In an embodiment, if the indication for indicating whether the PDCP is reestablished is not included in the RRC message or the handover command, the UE reestablishes the PDCP by default when applying the configuration in the handover command to perform the handover. In an embodiment, if the indication for indicating whether RLC is reestablished is not included in the RRC message or the handover command, the UE reestablishes RLC by default when applying the configuration in the handover command to perform the handover. In an embodiment, if the indication for indicating whether L2 is reestablished is not included in the RRC message or the handover command, the UE reestablishes the PDCP and RLC by default when applying the configuration in the handover command to perform the handover.

By means of this embodiment, the UE can determine, on the basis of the indication of the base station, whether it is necessary to reestablish the PDCP or the RLC entity, thereby avoiding the overheads and latency caused by unnecessary reestablishment of the PDCP or the RLC entity.

The methods and related devices according to the present application have been described above in conjunction with the preferred embodiments. It should be understood by those skilled in the art that the methods shown above are only exemplary. The method according to the present application is not limited to steps or sequences shown above. The network node and user equipment shown above may include more modules; for example, the network node and user equipment may further include modules that can be developed or developed in the future to be applied to a base station or UE, and the like. Various identifiers shown above are only exemplary, and are not intended to limit the present application. The present application is not limited to specific information elements serving as examples of these identifiers. Those skilled in the art can make various alterations and modifications according to the teachings of the illustrated embodiments.

It should be understood that the above-described embodiments of the present application may be implemented through software, hardware, or a combination of software and hardware. For example, various components of the base station and user equipment in the above embodiments can be implemented through multiple devices, and these devices include, but are not limited to: an analog circuit device, a digital circuit device, a digital signal processing (DSP)

circuit, a programmable processor, an application specific integrated circuit (ASIC), a field programmable gate array (FPGA), and a complex programmable logic device (CPLD), and the like.

In this application, the "base station" refers to a mobile communication data and control switching center with large transmission power and wide coverage area, including resource allocation scheduling, data receiving, and transmitting functions. The term "user equipment" refers to a user mobile terminal, such as a terminal device that can perform wireless communication with a base station or a micro base station, including a mobile phone, a notebook, or the like.

In addition, the embodiments of the present application disclosed herein may be implemented on a computer program product. More specifically, the computer program product is a product provided with a computer-readable medium having computer program logic encoded thereon. When being executed on a computing device, the computer program logic provides related operations to implement the above-described technical solutions of the present application. The computer program logic enables a processor to perform the operations (methods) described in the embodiments of the present application when the product is executed on at least one processor of a computing system. Such an arrangement of the present application is typically provided as software, code, and/or other data structures that are configured or encoded on a computer-readable medium, such as an optical medium (for example, a CD-ROM), a floppy disk, or a hard disk, or other media such as firmware or microcode on one or more ROM or RAM or PROM chips, or downloadable software images, shared databases and so on in one or more modules. Software or firmware or such configuration may be installed on a computing device such that one or more processors in the computing device perform the technical solutions described in the embodiments of the present application.

In addition, each functional module or each feature of the base station device and the terminal device used in each of the above embodiments may be implemented or executed by a circuit, which is usually one or more integrated circuits. Circuits designed to execute various functions described in this description may include general purpose processors, digital signal processors (DSPs), application specific integrated circuits (ASICs) or general purpose integrated circuits, field programmable gate arrays (FPGAs) or other programmable logic devices, discrete gates or transistor logic, or discrete hardware components, or any combination of the above. The general-purpose processor can be a microprocessor, or the processor can be an existing processor, a controller, a microcontroller, or a state machine. The above-mentioned general purpose processor or each circuit may be configured with a digital circuit or may be configured with a logic circuit. In addition, when an advanced technology that can replace current integrated circuits emerges due to advances in semiconductor technology, the present application may also use integrated circuits obtained using this advanced technology.

Although the present application has been shown in connection with the preferred embodiments of the present application, it will be understood by those skilled in the art that various modifications, substitutions and alterations may be made to the present application without departing from the spirit and scope of the present application. Accordingly, the present application should not be defined by the above-described embodiments, but should be defined by the appended claims and their equivalents.

The program running on the device according to the present application can be a program that enables the computer to implement the functions of the embodiments of the present application by controlling the central processing unit (CPU). The program or information processed by the program can be stored temporarily in volatile memory (e.g., random access memory RAM), hard disk drive (HDD), non-volatile memory (e.g., flash memory), or other memory systems.

The program for implementing the functions of the embodiments of the present application may be recorded on a computer-readable recording medium. The corresponding functions can be achieved by reading programs recorded on the recording medium and executing them by the computer system. The so-called "computer system" may be a computer system embedded in the device, which may include operating systems or hardware (e.g., peripherals). The "computer-readable recording medium" may be a semiconductor recording medium, an optical recording medium, a magnetic recording medium, a short-time dynamic memory program, or any other recording medium readable by a computer.

Various features or functional modules of the device used in the above embodiments may be implemented or executed by circuits (e.g., monolithic or multi-chip integrated circuits). Circuits designed to execute the functions described in this description may include general-purpose processors, digital signal processors (DSPs), application specific integrated circuits (ASICs), field programmable gate arrays (FPGAs) or other programmable logic devices, discrete gates or transistor logic, or discrete hardware components, or any combination of the above. The general-purpose processor may be a microprocessor, or may be any existing processor, a controller, a microcontroller, or a state machine. The circuit may be a digital circuit or an analog circuit. When new integrated circuit technologies that replace existing integrated circuits emerge because of advances in the semiconductor technology, the present application can also be implemented using these new integrated circuit technologies.

The program running on the device according to the present application may be a program that enables the computer to implement the functions of the embodiments of the present application by controlling the central processing unit (CPU). The program or information processed by the program can be stored temporarily in volatile memory (e.g., random access memory RAM), hard disk drive (HDD), non-volatile memory (e.g., flash memory), or other memory systems.

Furthermore, the present application is not limited to the embodiments described above. Although various examples of the described embodiments have been described, the present application is not limited thereto. Fixed or non-mobile electronic devices installed indoors or outdoors, such as AV equipment, kitchen equipment, cleaning equipment, air conditioner, office equipment, vending machines, and other household appliances, may be used as terminal devices or communications devices.

The embodiments of the present application have been described in detail above with reference to the accompanying drawings. However, the specific structures are not limited to the above embodiments, and the present application also includes any design modifications that do not depart from the main idea of the present application. In addition, various modifications can be made to the present application within the scope of the claims, and embodiments resulting from the appropriate combination of the technical means disclosed in different embodiments are also included within the technical scope of the present application. In addition, components with the same effect described in the above embodiments may be replaced with one another.

The invention claimed is:

1. A User Equipment (UE), comprising:
receiving circuitry configured to receive, from a base station, a radio resource control (RRC) message for handover, the RRC message indicating:
   whether a Radio Link Control (RLC) entity is to be reestablished, and
   whether a Packet Data Convergence Protocol (PDCP) entity is to be reestablished; and
processing circuitry configured to perform a handover procedure by:
   determining whether the RRC message includes a first indication indicating that the RLC entity is to be reestablished;
   reestablishing the RLC entity in response to a determination that the RRC message includes the first indication;
   forgoing reestablishing the RLC entity in response to a determination that the RRC message does not include the first indication;
   determining whether the RRC message includes a second indication indicating that the PDCP entity is to be reestablished;
   reestablishing the PDCP entity in response to a determination that the RRC message includes the second indication; and
   forgoing reestablishing the PDCP entity in response to a determination that the RRC message does not include the second indication.

2. A base station, comprising:
sending circuitry configured to send, to a user equipment (UE), a radio resource control (RRC) message for handover, the RRC message indicating:
   whether a Radio Link Control (RLC) entity is to be reestablished, and
   whether a Packet Data Convergence Protocol (PDCP) entity is to be reestablished,
wherein the RRC message is processed by the UE in a handover procedure to:
   determine whether the RRC message includes a first indication indicating that the RLC entity is to be reestablished;
   reestablish the RLC entity in response to a determination that the RRC message includes the first indication;
   forgo reestablishing the RLC entity in response to a determination that the RRC message does not include the first indication;
   determine whether the RRC message includes a second indication indicating that the PDCP entity is to be reestablished;
   reestablish the PDCP entity in response to a determination that the RRC message includes the second indication; and
   forgo reestablishing the PDCP entity in response to a determination that the RRC message does not include the second indication.

3. A method performed by a User Equipment (UE), the method comprising:
receiving, from a base station, a radio resource control (RRC) message for handover, the RRC message indicating:
   whether a Radio Link Control (RLC) entity is to be reestablished, and
   whether a Packet Data Convergence Protocol (PDCP) entity is to be reestablished;
determining whether the RRC message includes a first indication indicating that the RLC entity is to be reestablished;
reestablishing the RLC entity in response to a determination that the RRC message includes the first indication;
forgoing reestablishing the RLC entity in response to a determination that the RRC message does not include the first indication;
determining whether the RRC message includes a second indication indicating that the PDCP entity is to be reestablished;
reestablishing the PDCP entity in response to a determination that the RRC message includes the second indication; and
forgoing reestablishing the PDCP entity in response to a determination that the RRC message does not include the second indication.

4. A method performed by a base station, comprising:
sending, to a user equipment (UE), a radio resource control (RRC) message for handover, the RRC message indicating:
   whether a Radio Link Control (RLC) entity is to be reestablished, and
   whether a Packet Data Convergence Protocol (PDCP) entity is to be reestablished,
wherein the message is processed by the UE in a handover procedure to:
   determine whether the RRC message includes a first indication indicating the RLC entity is to be reestablished;
   reestablish the RLC entity in response to a determination that the RRC message includes the first indication;
   forgo reestablishing the RLC entity in response to a determination that the RRC message does not include the first indication;
   determine whether the RRC message includes a second indication indicating that the PDCP entity is to be reestablished;
   reestablish the PDCP entity in response to a determination that the RRC message includes the second indication; and
   forgo reestablishing the PDCP entity in response to a determination that the RRC message does not include the second indication.

* * * * *